United States Patent
Aliwi et al.

(10) Patent No.: US 11,619,340 B2
(45) Date of Patent: Apr. 4, 2023

(54) TRANSPORTABLE RACK FOR PRESSURE SAFETY/RELIEF VALVES

(71) Applicant: SAUDI ARABIAN OIL COMPANY, Dhahran (SA)

(72) Inventors: Ali A Aliwi, Al Ahsa (SA); Omar M Hamdan, Udhailiyah (SA); Shadi M Hazmi, Al Ahsa (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 579 days.

(21) Appl. No.: 16/717,899

(22) Filed: Dec. 17, 2019

(65) Prior Publication Data
US 2021/0180745 A1     Jun. 17, 2021

(51) Int. Cl.
| | |
|---|---|
| *F16M 11/20* | (2006.01) |
| *F16B 5/02* | (2006.01) |
| *F16K 11/065* | (2006.01) |
| *F16K 17/00* | (2006.01) |
| *B65D 19/00* | (2006.01) |
| *B65D 19/44* | (2006.01) |

(52) U.S. Cl.
CPC ......... *F16M 11/2007* (2013.01); *B65D 19/00* (2013.01); *B65D 19/44* (2013.01); *F16B 5/0283* (2013.01); *F16K 11/065* (2013.01); *F16K 17/00* (2013.01); *F16B 2200/503* (2018.08)

(58) Field of Classification Search
CPC ............................... B65D 19/44; B65D 19/00
USPC ..................... 108/55.3, 55.1, 55.5
See application file for complete search history.

(56) References Cited

U.S. PATENT DOCUMENTS

| | | | |
|---|---|---|---|
| 1,864,305 A | 6/1932 | Holmes | |
| 2,312,434 A | 3/1943 | Nathan | |
| 2,444,326 A * | 6/1948 | Baker ................ | B65D 19/0026 108/55.3 |
| 2,507,588 A * | 5/1950 | Brandon ............ | B65D 19/0012 108/57.1 |

(Continued)

FOREIGN PATENT DOCUMENTS

| | | | |
|---|---|---|---|
| DE | 102010050361 A1 * | 12/2011 | ......... B65D 19/0028 |
| DE | 102011111142 A1 * | 2/2013 | |

(Continued)

OTHER PUBLICATIONS

International Search Report and Written Opinion of PCT Application No. PCT/US2020/065715 (SA51410) dated Apr. 16, 2021: pp. 1-13.

*Primary Examiner* — Jose V Chen
(74) *Attorney, Agent, or Firm* — Bracewell LLP; Constance G. Rhebergen; Douglas W. Rommelmann

(57) ABSTRACT

A transportable valve rack for securing a plurality of pressure safety or pressure relief valves in an upright position. The valves of the type having a bolted flange-type connection and the rack comprises a base assembly and a top plate mounted on the base assembly. The top plate includes a plurality of areas, with each area comprising a plurality of holes arranged on a circumference of two or more concentric circles. The plurality of holes extends through the top plate and at least four holes are on the circumference of each concentric circle. The holes are sized and arranged to align with bolt holes of pre-selected flanges of particular size and pressure rating. Nuts and bolts extended through aligned holes secure the valve to the valve rack.

20 Claims, 2 Drawing Sheets

(56) References Cited

U.S. PATENT DOCUMENTS

| | | | | |
|---|---|---|---|---|
| 2,548,289 | A | | 4/1951 | Carraher |
| 3,636,888 | A | * | 1/1972 | Angelbeck, Jr. ... B65D 71/0096 108/55.3 |
| 3,670,878 | A | * | 6/1972 | Seiler ................. G11B 23/0323 |
| 3,765,539 | A | * | 10/1973 | Boyle .................... B65D 71/70 211/85.5 |
| 3,799,333 | A | * | 3/1974 | Weir ...................... B65D 71/10 53/48.5 |
| 3,993,168 | A | * | 11/1976 | Kubick ............. B65D 19/0034 108/55.3 |
| 4,051,787 | A | * | 10/1977 | Nishitani ........... B65D 19/0012 108/55.3 |
| 4,263,855 | A | * | 4/1981 | Lawlor ................ B65D 19/004 108/55.3 |
| 4,966,288 | A | | 10/1990 | Kirkham |
| 5,329,862 | A | * | 7/1994 | Breezer ............. B65D 19/0012 108/55.5 |
| 5,758,771 | A | * | 6/1998 | Rose ...................... B65D 19/44 206/391 |
| 5,842,424 | A | * | 12/1998 | Prevot .................... B65D 19/44 108/55.3 |
| 6,044,773 | A | * | 4/2000 | Bauer .................... B25H 1/12 108/55.3 |
| 6,276,285 | B1 | * | 8/2001 | Ruch .................... B65D 19/44 248/346.03 |
| 6,484,877 | B1 | * | 11/2002 | Murakami ............. B65D 85/06 108/55.3 |
| 6,530,476 | B1 | * | 3/2003 | Overholt ............ B65D 71/0096 108/55.3 |
| 6,622,640 | B2 | * | 9/2003 | Taylor ................ B65D 90/0013 108/55.5 |
| 8,336,465 | B2 | * | 12/2012 | Poulsen ............. B65D 19/0095 108/55.3 |
| 8,875,638 | B2 | * | 11/2014 | Luis y Prado ..... B65D 19/0046 108/57.33 |
| 2010/0301245 | A1 | | 12/2010 | Accurso et al. |
| 2015/0001114 | A1 | * | 1/2015 | Kelly ................. B65D 19/0038 206/386 |
| 2017/0190467 | A1 | * | 7/2017 | Clark .................... B65D 19/04 |
| 2018/0265249 | A1 | * | 9/2018 | Grutt ................. B65D 19/0073 |
| 2019/0276187 | A1 | * | 9/2019 | Tamura .................. B65D 25/10 |
| 2020/0172289 | A1 | * | 6/2020 | Swartz .................. B65D 19/44 |

FOREIGN PATENT DOCUMENTS

| | | | |
|---|---|---|---|
| DE | 102011111142 A1 | 2/2013 | |
| DE | 202017004490 U1 | 11/2018 | |
| DE | 202017004490 U1 * | 1/2019 | |
| EP | 2481631 A1 * | 8/2012 | ................ B60P 3/40 |
| GB | 2450242 A * | 12/2008 | ........... B65D 19/004 |
| KR | 20140014910 A | 2/2014 | |

* cited by examiner

TRANSPORTABLE RACK FOR PRESSURE SAFETY/RELIEF VALVES

CROSS-REFERENCE TO RELATED APPLICATIONS

Not applicable.

BACKGROUND OF THE INVENTION

1. Field of the Invention

The present invention relates generally to the transportation and storage of flanged valves, and more particularly to the transportation and storage of flanged pressure relief valves and pressure safety valves.

2. Description of the Related Art

Pressure safety valves ("PS valves") and pressure relief valves ("PR valves") are commonly used terms to identify pressure relief devices on a vessel and other pressurized systems. Oftentimes, these terms are used interchangeably and it may entirely depend on the particular project or company standards to identify all the pressure relief devices either as "safety valves" or "relief valves" or sometimes as "safety relief valves". In general, both types of valves describe a relief device on a liquid-filled vessel or on a compressible fluid or gas-filled vessel or system in which the valve opens when the set value of the valve is reached. The present invention applies to either or both types of valves which will be described as PS/PR valves.

PS/PR valves appear to be very rugged components, yet these devices are delicate and have to be handled with extra caution, including during storage and transportation, to ensure their functionality is maintained and their accuracy is not compromised. PS/PR valve manufacturers recommend keeping the valves upright when stored or transported. The PS/PR valves should not be transported laying on their sides as they are more likely to sustain damage in this position.

Typically, in many facility operations, a PS/PR valve coming offline for service, overhaul or normal testing undergoes an "as-received test" and after such service, overhaul, or testing has to pass an "as-left test". Now any rough handling during the removal from the field down to the relief valve shop or vice versa could result in wrong and erroneous readings that may jeopardize the mechanical integrity of the pressure vessel being protected by such device.

Valves, such as PS/PR valves, are typically one of the first things removed from a unit during maintenance, outages or shutdowns. Valve removal and transportation delays can result in significant additional costs to any project, especially if the valve functionality is impacted due to rough handling during removal or if the valve end flanges are damaged due to improper transportation.

It is common for a facility to have several PS/PR valves of different sizes and different pressure ratings. Different sizes of valves have different flange diameters which results in different bolt circle diameters, numbers of bolts, and diameters of bolts. Oftentimes, different pressure ratings of the same size valve will have flanges with different bolt circle diameters, numbers of bolts, and diameters of bolts. It is to be understood that the bolt circle diameter is the diameter of a circle passing through the center of each hole.

It is desirable to have a transportable rack for valves, particularly PS/PR valves. It is further desirable that the PS/PR valves be secured to the rack in an upright position. It is also desirable that the rack is versatile and able to accommodate a plurality of PS/PR valves, including a plurality of sizes of valves, a plurality of same size valves of different pressure ratings, and a combination of PS/PR valves of different sizes and ratings.

SUMMARY OF THE INVENTION

A preferred embodiment of the invention is a transportable valve rack that allows a standard and quick transportation for a plurality of valves, including pressure safety valves and/or pressure relief valves (PS/PR valves), while in an upright position. The valve rack is also capable of accommodating valves, including PS/PR valves, of different sizes and pressure ratings. Additionally, the valves are secured to the rack to provide further protection against damage.

The valve rack is also versatile to accommodate, store and transfer multiple PS/PR valves of the same size and pressure rating, the same size and different pressure ratings, different sizes, and different sizes and different pressure ratings.

BRIEF DESCRIPTION OF THE SEVERAL VIEWS OF THE DRAWINGS

So that the manner in which the recited features, advantages and aspects of the embodiments of the present invention are attained and can be understood in detail, a more particular description of the invention may be had by reference to the preferred embodiments thereof which are illustrated in the appended drawings, which drawings are incorporated as a part hereof. It is noted however, that the appended drawings illustrate only typical embodiments of this invention and are therefore not to be considered limiting of its scope, for the invention may admit to other equally effective embodiments.

DESCRIPTION OF THE PREFERRED EMBODIMENTS

Figure 1:
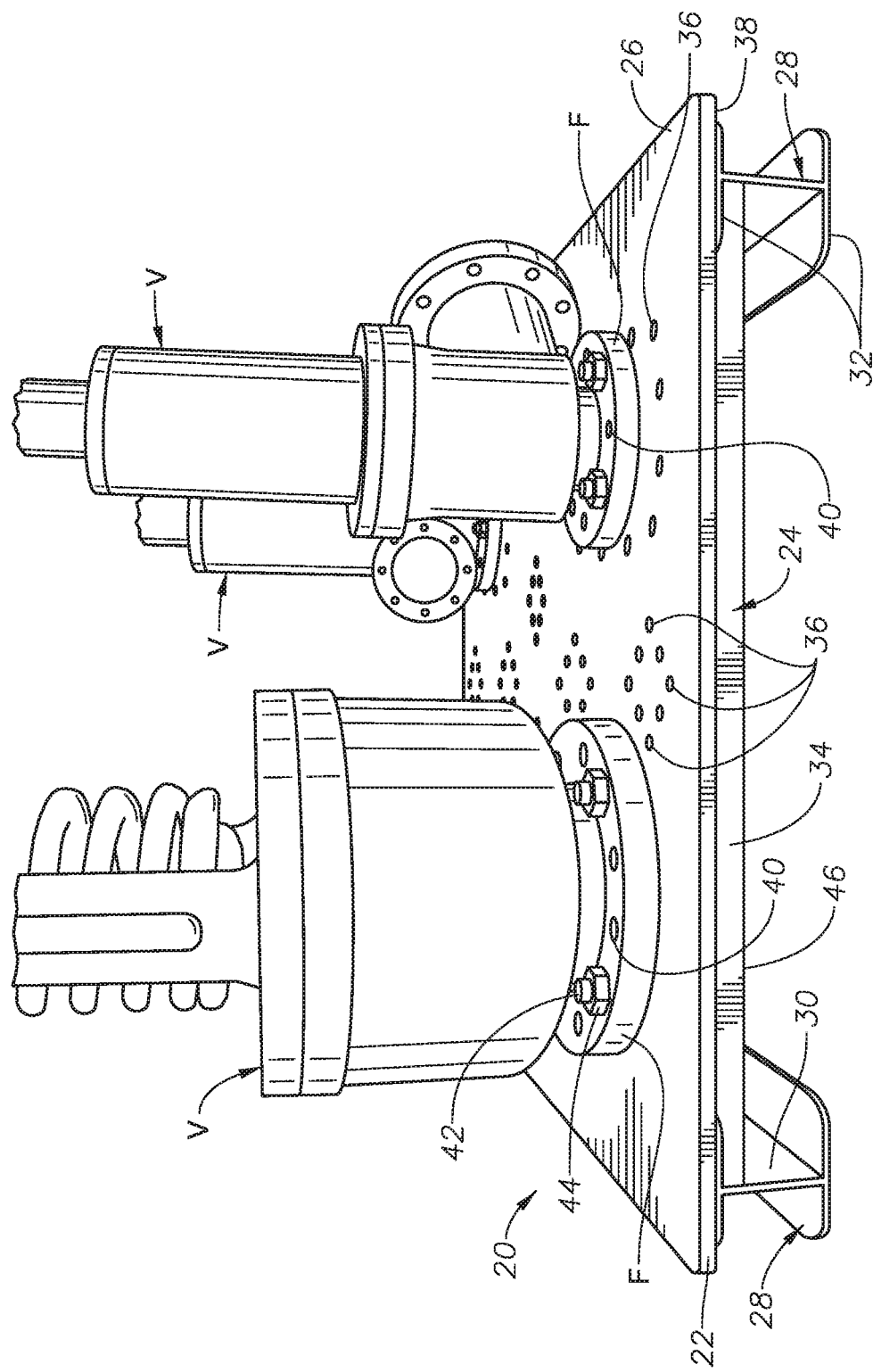
FIG. 1 is a perspective view of a transportable valve rack according to a preferred embodiment of the invention showing some valves mounted on the rack in an upright position.

While this invention is susceptible of embodiments of many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

A transportable valve rack, generally referred to as 20, is shown in perspective in FIG. 1 supporting a plurality of pressure safety and pressure relief valves (PS/PR valves), generally referred to as V, in an upright position on a valve flange F. The transportable valve rack 20 preferably includes a top plate 22 mounted on a base assembly 24. The top plate 22 preferably has a smooth, planer upper surface 26. The top plate 22 may be rectangular and may have a size of approximately four feet by four feet. It is to be understood that other shapes and sizes may also be used. The top plate 22 is securely and fixedly attached to the base assembly 24, as for example, by welds or bolts.

The base assembly 24 preferably includes at least a pair of support members 28 which maintain the top plate 22 off the floor and provide a space between the floor and top plate 22. In the embodiment shown in FIG. 1, each support member 28 is a beam, preferably including a vertical web 30 connected to upper and lower horizontal flanges 32. Preferably, the support members 28 are parallel to one another and extend along two opposing sides of the rectangular top plate 22. At least a pair of support braces 34 span between the vertical webs 30 of the support members 28. Preferably, there is a support brace 34 located at or near each end of the support members 28. As shown in FIG. 1, the support braces 34 are at an upper portion of the vertical webs 30 and adjacent the upper flanges and preferably abutting a lower surface 38 of the top plate 22. The support braces 34 are preferably attached to the vertical webs 30, upper flanges 32 and the top plate 22 by welding. The support braces 34 provide the top plate 22 with structural strength to prevent flexure of the top plate 22 between the support members 28 when loaded with the PS/PR valves V.

Preferably, the base assembly 24 provides support for the top plate 22 while also allowing for the transportable valve rack 20 to be easily moved, raised and/or transported using a forklift or similar device.

Still referring to FIG. 1, the top plate 22 includes a plurality of holes 36, preferably circular, extending through the top plate 22 from the upper surface 26 to the lower surface 38. The plurality of holes 36 are sized, positioned and arranged to correspond with various pre-selected flange bolt circle diameters, numbers of bolts, and diameters of bolts. This will be explained in greater detail below. The PS/PR valves V shown in FIG. 1 are secured to the transportable valve rack 20 by aligning all or at least some of the flange bolt holes 40 with top plate holes 36 corresponding to the flange size and pressure rating. With all or at least some of the flange bolt holes 40 aligned with corresponding top plate holes 36, threaded bolts 42 and nuts 44 may be used to secure the PS/PR valves V to the transportable valve rack 20 in their upright (vertical) position. The bolts 42, typically stud bolts, extend above and through the flange bolt hole 40, and through and below the top plate hole 36 and upper and lower nuts 44 are threaded onto the stud bolt 42. Once bolted to the transportable valve rack 20, the valve(s) V is ready to be transported.

It is to be understood that it is not necessary to have bolts 42 inserted in every flange bolt hole 40 in order to secure the valve V to the transportable valve rack 20. In some instances, this may be desirable; however, in many instances it may only be necessary or possible to install fewer bolts 42 than half of the number of flange bolt holes 40 as will be explained below with reference to FIG. 2. Preferably, each valve V is held in place by at least four bolts (depending on the size) spaced around the circumference of the valve flange F.

Placement of the face of the flange F on the smooth, planer upper surface 26 of the top plate 22 and securing the valve V to the valve rack 20 ensures protection of the valve flanges F, including the exposed valve flange as everything on the valve rack 20 is secured against movements such as shifting and rolling.

Preferably, the transportable valve rack 20 is made of steel, preferably carbon steel material, and coated to prevent corrosion.

It is known that same diameter flanges having different pressure ratings may have a different number of bolts, a different size of bolts, and a different bolt circle diameter. Flange dimensions are determined by pipe size and pressure class required for the application. Most of these dimensions have been standardized and published as ASME, API or other standardization organization specifications. ASME/ANSI B16.5 provides dimensions and tolerances for flanges in pipe sizes from ½" through 24" and in classes ranging 150 through 2500 (i.e., pressure ratings of 150 psi through 2500 psi).

Since a facility likely has PS/PR valves V of various sizes and classes, it is desirable for the transportable valve rack 20 to be able to carry and secure a variety of valve sizes and classes. An example of such a valve rack 20 is shown in FIG. 2.

Figure 2:
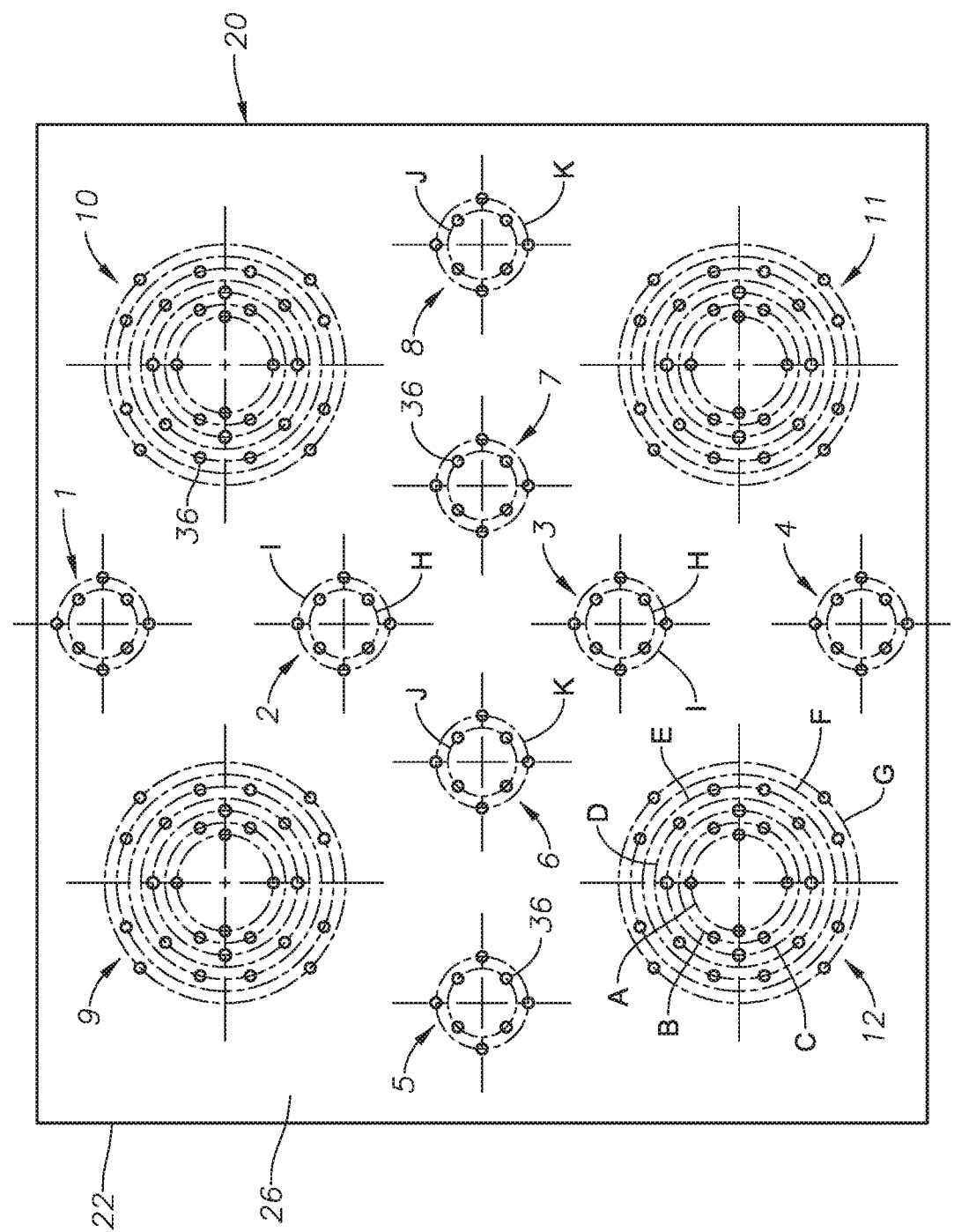
FIG. 2 is a top view of an illustrative embodiment of the transportable valve rack.

Referring to FIG. 2, the top plate 22 is shown having twelve areas or groups of concentric circles. The concentric circles in each group have a common centerpoint. The groups are numbered 1 through 12 on FIG. 2. For purposes of this example, the pair of concentric circles in groups 1-4 are identical, the pair of concentric circles in groups 5-8 are identical, and the seven concentric circles in groups 9-12 are identical. It is to be understood that the arrangement described and shown in FIG. 2 is merely for illustrative purposes and is not limiting to the scope of the invention. Each group of concentric circles is a location for securing a valve V to the valve rack 20. Thus, space permitting the valve rack 20 shown in FIG. 2 has twelve locations for securing valves V to the rack 20.

Beginning with the corner groups 9, 10, 11 and 12, each group includes seven concentric circles identified as A, B, C, D, E, F and G. Each of the seven concentric circles corresponds with at least one specific valve flange size and rating. Thus, each corner group of concentric circles is capable of having one valve V secured thereto selected from at least seven different valve flange sizes and ratings.

Each of the four vertically-aligned groups 1, 2, 3 and 4, includes two concentric circles identified as H and I. Each of the two concentric circles corresponds with at least one specific valve flange size and rating. Thus, each of the four vertical groups of concentric circles is capable of having one valve V secured thereto selected from at least two different valve flange sizes and ratings.

Each of the four horizontally-aligned groups 5, 6, 7 and 8, includes two concentric circles identified as J and K. Each of the two concentric circles corresponds with at least one specific valve flange size and rating. Thus, each of the four horizontal groups of concentric circles is capable of having one valve V secured thereto selected from at least two different valve flange sizes and ratings.

For exemplary purposes, the valve size and pressure class, number of bolts, diameter of bolts and bolt circle diameter for A through K are listed below:

|   | Valve size (inches) | Pressure Class | Number of Bolts | Bolt Dia. (inches) | Bolt Circle (inches) |
|---|---|---|---|---|---|
| A | 1 | 300 | 4 | ⅝ | 3½ |
| B | 2 | 300 | 8 | ⅝ | 5 |
| C | 3 | 300 | 8 | ¾ | 6⅝ |
| D | 4 | 300 | 8 | ¾ | 7⅞ |
| E | 4 | 900 | 8 | 1⅛ | 9¼ |
| F | 6 | 300 | 12 | ¾ | 10⅝ |
| G | 8 | 300 | 12 | ⅞ | 13 |
| H | 1 | 300 | 4 | ⅝ | 3½ |
| I | 9 | 300 | 8 | ⅝ | 5 |
| J | 1½ | 300 | 4 | ¾ | 4½ |
| K | 1½ | 900 | 4 | 1 | 4⅞ |

It is to be understood that the concentric circles A-K represent bolt circles. With reference to the inner concentric circle J, the four holes 36 are uniformly spaced and each hole 36 has a centerpoint on the circumference of a circle having a diameter of 4½". Typically, the holes 36 in the top plate 22 are approximately ⅛$^{th}$ inch larger in diameter than the bolt diameter. Thus, the holes 36 on concentric circle J would be ⅞" in diameter. Concentric circle J accommodates a 1½" valve, class 300 having four flange bolts.

With reference to the outer concentric circle K, the four holes 36 are uniformly spaced and have their centerpoints on a circle having a diameter of 4⅞" and the holes 36 on concentric circle K are 1⅛" in diameter. Concentric circle K accommodates a 1½" valve, class 900 having four flange bolts.

Preferably, the holes 36 on concentric circle K are radially offset from the holes 36 on concentric circle J for purposes of spacing requirements and preventing the holes of the two concentric circles J and K from being too close to each other.

As stated above, the concentric circles A-K represent bolt circles; however, not every concentric circle necessarily includes the number of holes corresponding to the specific valve flange F. For example, concentric circle I has only four holes 36 even though it accommodates a 2" valve, class 300 having 8 flange bolts. The four holes 36 are preferably uniformly spaced and radially offset from the four holes on inner concentric circle H.

The concentric circles A-G in the corner groups 9, 10, 11 and 12, each have at least four holes 36 spaced to provide the necessary support to maintain the valve V in the upright position during storage and/or transport. Preferably, the valve rack 20 includes at least four spaced holes for each flange size and rating it can accommodate. For example, although an 8" valve, class 300 flange has twelve bolt holes to receive ⅞" bolts, the top plate 22 has four holes spaced on the bolt circle diameter and spacing as shown on concentric circle G.

Preferably, the support braces 34 provide a lower surface 46 that provides an area suitable for a pair of forks of a fork lift or similar device to be positioned under for the purpose of lifting and transporting the valve rack 20. Additionally, it may be preferable that the distance between the lower surface 46 and the bottom of the support member 28 provides adequate space for a worker's arm to extend through to install and tighten bolts 42 and nuts 44 when the valve rack 20 is resting on the floor. It may also be preferable that the spacing between the lower surface 46 of the support brace 34 and the lower surface 38 of the top plate 22 is greater than the required distance needed for the nut 44 and bolt 42 below the lower surface 38 of the top plate 22 so that the forks of the forklift will not come into contact with the bolts 42 and nuts 44.

It is to be understood that the combinations of number of groups of concentric circles and spacing and arrangement is almost without limit. Preferably, enough space is provided between each group such that it is possible to fill the rack 20 with a valve V secured in each group. Alternatively, there may be instances where it is desired to be able to accommodate a larger number of valve sizes and classes which results in not every group having adequate space for securing a valve in every instance.

It is to be understood that the valve rack 20 can be designed specifically for the required PS/PR valves V that are present in the facility, including the quantities of each valve V in the facility. For example, the rack illustration above can accommodate up to eight 1" valves, class 300 at one time, if needed, including space for valves V in groups 5, 6, 7 and 8. Similarly, it can alternately accommodate up to eight 2" valves, class 300 at one time, if needed, including space for valves V in groups 5, 6, 7 and 8. The above rack illustration is designed to accommodate eleven different valve sizes and ratings. This number can be modified simply by adjusting the number of differing concentric circles. The valve rack 20 shown in FIG. 2 can accommodate and store up to twelve valves V in an upright position. This number can be modified by adjusting the number of areas or groups.

The transportable valve rack 20 includes one or more of the following features:

Can accommodate/store a plurality of valves V of the same size and same flange ratings Can accommodate/store a plurality of valves V of the same size and multiple flange ratings Can accommodate/store a plurality of valves V of various sizes and pressure ratings Ability to transport multiple PS/PR valves V at the same time (saves time and effort)

Ability to fit common sizes and ratings of PS/PR valves V

Ensures perfect protection to valve flanges F

Each valve V is secured to the rack 20 (valve V is mounted vertically on top of the top plate 22 and held in place by four bolts or so (depending on the size))

Made of carbon steel material

Coated to prevent corrosion.

The foregoing disclosure and description of the invention are illustrative and explanatory thereof, and various changes in the size, shape and materials, as well as in the details of the illustrated construction, may be made without departing from the spirit of the invention. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

While the invention has been described in detail above with reference to specific embodiments, it will be understood that modifications and alterations in the embodiments disclosed may be made by those practiced in the art without departing from the spirit and scope of the invention. All such modifications and alterations are intended to be covered. In addition, all publications cited herein are indicative of the level of skill in the art and are hereby incorporated by reference in their entirety as if each had been individually incorporated by reference and fully set forth.

We claim:

1. A transportable valve rack (20) comprising:
   a base assembly (24);
   a top plate (22) mounted on the base assembly, the top plate including a plurality of holes (36), the plurality of holes comprising:
      a first plurality of holes (36) comprising at least three holes having a first hole diameter arranged on a circumference of a first circle (A) having a first circle diameter; and
      a second plurality of holes (36) comprising at least three holes having a second hole diameter arranged on a circumference of a second circle (C) having a second circle diameter,
      wherein the second circle is concentric with the first circle, the second circle diameter is larger than the first circle diameter, and the first hole diameter is different than the second hole diameter.

2. The transportable valve rack (20) of claim 1, wherein the top plate (22) has a planer upper surface (26) and a lower surface (38), the first and second plurality of holes (36) extending through the top plate from the upper surface to the lower surface.

3. The transportable valve rack (20) of claim 1, wherein each hole of the first plurality of holes (36) is circular and has a centerpoint on the circumference of the first circle (A), and each hole of the second plurality of holes (36) is circular and has a centerpoint on the circumference of the second circle (C).

4. The transportable valve rack (20) of claim 1, wherein the first plurality of holes (36) comprises at least four holes and the second plurality of holes (36) comprises at least four holes.

5. The transportable valve rack (20) of claim 1, wherein the holes of the first plurality of holes (36) are spatially arranged and sized to concurrently align with bolt holes (40) of a first pre-selected flange (F) of a particular size and pressure rating, and the holes of the second plurality of holes (36) are spatially arranged and sized to concurrently align with bolt holes (40) of a second pre-selected flange (F) of a particular size and pressure rating, wherein the first and second pre-selected flanges are not identical.

6. The transportable valve rack (20) of claim 5, further comprising a plurality of first nuts (44) and first bolts (42), wherein the first bolts are arranged and designed to extend through the first plurality of holes (36) and the aligned bolt holes (40) of the first pre-selected flange (F) and the first nuts are arranged and designed to engage the first bolts and secure the first pre-selected flange to the top plate (22),
  wherein the bolts and nuts prevent the pre-selected flange (F) from sliding relative to the top plate.

7. The transportable valve rack (20) of claim 1, wherein the plurality of holes (36) further comprises:
  a third plurality of holes (36) comprising at least three holes having a third hole diameter arranged on a circumference of a third circle (E) having a third circle diameter; and
  a fourth plurality of holes (36) comprising at least three holes having a fourth hole diameter arranged on a circumference of a fourth circle (G) having a fourth circle diameter,
  wherein the fourth circle is concentric with the third circle and the fourth circle diameter is larger than the third circle diameter.

8. The transportable valve rack (20) of claim 7, wherein the holes of the first plurality of holes (36) are spatially arranged and sized to concurrently align with bolt holes (40) of a first pre-selected flange (F) of a particular size and pressure rating, the holes of the second plurality of holes (36) are spatially arranged and sized to concurrently align with bolt holes (40) of a second pre-selected flange (F) of a particular size and pressure rating, the holes of the third plurality of holes (36) are spatially arranged and sized to concurrently align with bolt holes (40) of a third pre-selected flange (F) of a particular size and pressure rating, and the holes of the fourth plurality of holes (36) are spatially arranged and sized to concurrently align with bolt holes (40) of a fourth pre-selected flange (F) of a particular size and pressure rating,
  wherein the first, second, third and fourth pre-selected flanges are different from one another,
  wherein the third and fourth circles (E, G) are concentric with the first and second circles (A, C) and the first, second, third and fourth concentric circles define an area on the top plate for securing a valve (V) having one of the four pre-selected flanges of particular size and pressure rating.

9. The transportable valve rack (20) of claim 8, wherein the top plate (22) comprises a plurality of the areas (9, 10, 11, 12) having the first, second, third and fourth pluralities of holes (36) on concentric circles spatially arranged and sized to concurrently align with bolt holes (40) of the first, second, third and fourth pre-selected flanges (F) of a particular size and pressure rating, respectively, and each of the plurality of areas on the top plate is adapted for securing a valve (V) having one of the four pre-selected flanges of particular size and pressure rating.

10. The transportable valve rack (20) of claim 8, wherein the third hole diameter is different than the fourth hole diameter.

11. The transportable valve rack (20) of claim 10, wherein the third hole diameter is different than the first and second hole diameters.

12. The transportable valve rack (20) of claim 7, wherein the holes of the first plurality of holes (36) are spatially arranged and sized to concurrently align with bolt holes (40) of a first pre-selected flange (F) of a particular size and pressure rating, the holes of the second plurality of holes (36) are spatially arranged and sized to concurrently align with bolt holes (40) of a second pre-selected flange (F) of a particular size and pressure rating, the holes of the third plurality of holes (36) are spatially arranged and sized to concurrently align with bolt holes (40) of a third pre-selected flange (F) of a particular size and pressure rating, and the holes of the fourth plurality of holes (36) are spatially arranged and sized to concurrently align with bolt holes (40) of a fourth pre-selected flange (F) of a particular size and pressure rating,
  wherein the first, second, third and fourth pre-selected flanges are different from one another,
  wherein the first and second plurality of holes define a first area on the top plate and the third and fourth plurality of holes define a second area on the top plate separated from the first area, and the first area on the top plate is capable of securing a valve having one of the first or second pre-selected flanges of particular size and pressure rating and the second area is capable of securing a valve having one of the third or fourth pre-selected flanges of particular size and pressure rating.

13. The transportable valve rack (20) of claim 1, wherein the base assembly (24) comprises a pair of support members (28) and a pair of support braces (34) extending between the pair of support members, the support members having a height and the support braces having a height, wherein the height of the support members is greater than the height of the support braces,
  wherein the top plate (22) is rectangular and comprises first and second pairs of opposing sides, the pair of support members aligned adjacent the first pair of opposing sides and the pair of support braces aligned with the second pair of opposing sides, and
  wherein the pair of support members and the pair of support braces are directly secured to the top plate.

14. A transportable valve rack (20) for securing a plurality of pressure safety or pressure relief valves (V) in an upright position, the valves (V) of the type having a bolted flange-type connection, comprising:
  a base assembly (24);
  a top plate (22) mounted on the base assembly, the top plate comprising a plurality of areas (1, 2, 3, 4, 5, 6, 7, 8, 9, 10, 11, 12) spatially separated from one another, with each area defined by a plurality of holes (36) arranged on a circumference of two or more concentric circles (A, B, C, D, E, F, G, H, I, J, K), the plurality of holes extending through the top plate,
  wherein each area of the plurality of areas (1, 2, 3, 4, 5, 6, 7, 8, 9, 10, 11, 12) defines a location for securing a valve (V) in the upright position and the space between the areas permits a valve (V) to be secured in each area at the same time, wherein the plurality of areas (1, 2, 3, 4, 5, 6, 7, 8, 9, 10, 11, 12) comprises first, second, and third areas spatially separated from one another, wherein the first area includes at least two concentric circles having a plurality of holes arranged on the circumference of each of the concentric circles in the first area, the second area includes at least two concentric circles having a plurality of holes arranged on the circumference of each of the concentric circles in the second area, and the third area includes at least four concentric circles having a plurality of holes arranged on the circumference of each of the concentric circles in the third area, the concentric circles in the first area have different diameters than the concentric circles in the second area, the plurality of holes in the first area have a first diameter, and the plurality of holes in the second area have a second diameter and a third diameter which are different from one another and also different than the first diameter.

15. The transportable valve rack (20) of claim 14, wherein the plurality of holes (36) on the circumference of each concentric circle in the first, second and third areas is capable of aligning with bolt holes (40) of at least one pre-selected flange (F) of a particular size and pressure rating.

16. The transportable valve rack (20) of claim 15, wherein the plurality of holes (36) on the circumference of each concentric circle includes at least four holes (36) on the circumference of each of at least ten circles (A, B, C, D, E, F, G, H, I, J, K) based on at least ten different pre-selected flanges (F) of a particular size and pressure rating.

17. The transportable valve rack (20) of claim 14, wherein the plurality of areas (1, 2, 3, 4, 5, 6, 7, 8, 9, 10, 11, 12) comprises at least ten separate areas with each area capable of securing a valve (V) to the top plate (22) at the same time.

18. The transportable valve rack (20) of claim 14, wherein each hole in at least one of the plurality of areas (1, 2, 3, 4, 5, 6, 7, 8, 9, 10, 11, 12) is on the circumference of a concentric circle (A, B, C, D, E, F, G, H, I, J, K).

19. The transportable valve rack (20) of claim 14, wherein the first area (1) is adjacent to the second area (2) and separated from the second area (2) by a non-perforated upper plate portion.

20. The transportable valve rack (20) of claim 19, wherein each hole in at least one of the first and second areas is on the circumference of a concentric circle (H, I).

\* \* \* \* \*